US00RE46166E

(19) United States
(12) Reissued Patent
Soong et al.

(10) Patent Number: US RE46,166 E
(45) Date of Reissued Patent: Sep. 27, 2016

(54) CHARGING SYSTEM OF ELECTRIC VEHICLE AND METHOD FOR CHARGING ELECTRIC VEHICLE

(71) Applicant: Go-Tech Energy Co., Ltd., New Taipei (TW)

(72) Inventors: Tzu-Wen Soong, New Taipei (TW); Ching-Tsung Hu, New Taipei (TW)

(73) Assignee: Go-Tech Energy Co., Ltd., New Taipei (TW)

(21) Appl. No.: 14/813,336

(22) Filed: Jul. 30, 2015

Related U.S. Patent Documents

Reissue of:
(64) Patent No.: 8,497,660
Issued: Jul. 30, 2013
Appl. No.: 13/084,710
Filed: Apr. 12, 2011

(51) Int. Cl.
*H02J 7/00* (2006.01)
*G07F 15/00* (2006.01)
*B60L 11/18* (2006.01)

(52) U.S. Cl.
CPC ..... *G07F 15/005* (2013.01); *B60L 11/1822* (2013.01); *B60L 11/1824* (2013.01)

(58) Field of Classification Search
CPC ..... H02J 7/0021; H02J 7/34; B60L 8/00; G07F 15/005
USPC ..... 320/104, 106, 10, 109
See application file for complete search history.

(56) References Cited

U.S. PATENT DOCUMENTS

| | | | | |
|---|---|---|---|---|
| 8,183,826 | B2 * | 5/2012 | Tuffner | H02J 7/34 320/107 |
| 8,319,358 | B2 * | 11/2012 | Curry | B60L 8/00 290/1 A |
| 8,928,273 | B2 * | 1/2015 | Soong | H02J 7/0021 320/104 |
| 2003/0209375 | A1 * | 11/2003 | Suzuki et al. | 180/65.3 |
| 2004/0073440 | A1 * | 4/2004 | Garbers et al. | 705/1 |
| 2004/0169489 | A1 * | 9/2004 | Hobbs | 320/104 |
| 2008/0281732 | A1 * | 11/2008 | Yamada | 705/30 |

* cited by examiner

*Primary Examiner* — Linh M Nguyen

(57) ABSTRACT

A charging system of an electric vehicle and a method for charging the electric vehicle are described in the present invention. The system uses a smart card for battery management when charging a battery. Furthermore, the system can prevent the battery or the electric vehicle from being stolen. Compared to existing charging systems for electric vehicles, the present invention can save more cost for users and provide safety mechanism for battery or electric vehicle.

23 Claims, 7 Drawing Sheets

CHARGING SYSTEM OF ELECTRIC VEHICLE AND METHOD FOR CHARGING ELECTRIC VEHICLE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to a charging system of an electric vehicle and a method for charging the electric vehicle. More particularly, the present invention relates to a charging system of an electric vehicle and the method for charging the electric vehicle using a smart card for battery management when charging the battery.

BACKGROUND OF THE INVENTION

An electric vehicle, also referred to as an electric drive vehicle, is a moving vehicle using one or more electric motors as driving system. Unlike petroleum-based transportations which are moved by the energy from gasoline, the electric vehicles use electric power as their propulsion. They won't generate waste gas. Noise is also less. During the last few decades, increased concern over the environmental impact of the petroleum-based transportation, along with the spectre of peak oil, has led to renewed interest in electric transportation. Electric power for electric vehicles can be generated from a wide range of sources, including fossil fuels, nuclear power, and renewable sources such as tidal power, solar power, and wind or any combination of those.

In the past, an electric vehicle consumes huge electric power due to their power system. The electric power can only be transmitted to the car through overhead lines. This infrastructure makes the electric vehicles impossible to be popular. Only some of public transportations have access to it. Routes of the public transportation are strictly limited by the lined arrangement. With the development in power systems of electric vehicles, especially in batteries, the electric vehicles become a future star and more and more sources are devoted in this field.

People are used to their existing life experience. Hence, a system for charging the batteries of the electric vehicles should be as convenient as a gas station system. When batteries of an electric car are in low battery, people can drive the car to a nearby charging station and get the batteries charged or replaced with full charged ones. Preferably, the batteries can be charged during off-peak period when cost of charge of electricity is lowest. Meanwhile, with a device to manage batteries that are used in the car, people can always know the status of the batteries and mechanics of the stations can trace the batteries for maintenance. Since the batteries are expensive, if the batteries are stolen and they can be easily found, it will be a great help for the car owners. However, the requirements mentioned above need an integrated system to fulfill.

U.S. Pat. No. 7,679,366 discloses a method for recharging an electric storage battery in a charging system of an electric vehicle. Please refer to FIG. 1. Power comes from an electric utility power grid. '366 Patent includes determining the length of time required to recharge the battery, determining the desired time when the recharge is to be completed, transmitting to the electric power utility the length of time required to recharge the battery and the desired time, and recharging the battery from the utility grid during a period when projected load demand is lower than peak demand and ending no later than the desired time.

'366 Patent is for hybrid electric vehicles, not for pure electric vehicles. The method only focuses on an optimal way to charge the batteries through a day so that time for low demand of electricity can be fully applied and charging cost can be minimal. However, no solution for battery management is mentioned.

Another prior art is disclosed in U.S. Pat. No. 7,795,841. Please refer to FIG. 2. '841 Patent provides a charging system and method capable of starting or stopping charging a battery of a vehicle at a convenient time. A portable device and a vehicle unit can communicate with each other. A user is determined to be away from the vehicle based on a result of communication between the portable device and the vehicle unit. A charging ECU starts charging a battery when the user is away from the vehicle. Charging of the battery can be started when the user is assumed to have stopped using the vehicle and will not use the vehicle for a period of time. When the user is determined to be close to the vehicle it is assumed that use of the vehicle will be resumed at which point the system instructs the charging of the battery to be stopped. The system allows the vehicle to be ready for use.

'841 Patent is also applied to hybrid electric vehicles. It uses the portable device to control the process of charging. However, the portable device can not inform the user of charging or battery status. Charging schedule can not be set to utilize off-peak time of electric power source to save cost.

None of the prior arts can provide an integrated system and method for charging the electric vehicle using a smart card for battery management when charging the battery, preventing the batteries from being stolen, or save charging expense for users. Hence, an integrated system and a method for charging electric vehicles having above features are still desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a charging system of an electric vehicle, comprises: a smart card having a user identification (UID) for identifying a user of the electric vehicle; a first rechargeable battery having first battery information and stored with the UID while installed in the electric vehicle, for providing electric power to the electric vehicle; a second rechargeable battery having second battery information and stored with the UID while the first rechargeable battery in low battery is replaced with the second rechargeable battery; and a charging station, comprising: a controlling module for confirming that the first rechargeable battery is stored with the UID and then allowing replacement of the first rechargeable battery with the second rechargeable battery; an updating unit for writing the UID to the second rechargeable battery while the first rechargeable battery is replaced with the second rechargeable battery; and a charging set for charging the first and second rechargeable batteries.

Preferably, the first and second rechargeable batteries each has a unique and unchangeable battery serial number.

Preferably, the first and second battery information each comprises charging state, lifetime, cycle count and health state of the rechargeable battery.

Preferably, the charging system further includes a transmitter for transmitting the charging state, lifetime, cycle count and health state of the rechargeable battery, and UID to a remote computer via local area network (LAN), wide area network (WAN), wireless LAN or wireless WAN.

Preferably, the remote computer is stored with the UID, user name, user telephone number, and license plate number of the electric vehicle.

Preferably, the charging system further includes a billing unit for billing the user while replacing the first rechargeable battery with the second rechargeable battery.

Preferably, the charging system further includes a notifying unit for notifying the user update of battery information via instant messaging service, short message service (SMS) or email.

In accordance with an aspect of the present invention, in an electric vehicle having a first rechargeable battery, a method for charging the electric vehicle, comprises the steps of: storing in a smart card a user identification (UID) for identifying a user of the electric vehicle; determining whether the first rechargeable battery is stored with the UID; replacing the first rechargeable battery in low battery with a second rechargeable battery; and writing the UID to the second rechargeable battery while the first rechargeable battery is replaced with the second rechargeable battery.

Preferably, the first and second rechargeable batteries each has a unique and unchangeable battery serial number.

Preferably, the first and second rechargeable battery each has battery information which comprises charging state, lifetime, cycle count and health state of the rechargeable battery.

Preferably, the charging method further includes a step of notifying the user update of the battery information via instant messaging service, short message service (SMS) or email.

Preferably, the charging method further includes a step of transmitting the charging state, lifetime, cycle count and health state of the rechargeable battery, and UID to a remote computer via local area network (LAN), wide area network (WAN), wireless LAN or wireless WAN.

Preferably, the remote computer is stored with the UID, user name, user telephone number, and license plate number of the electric vehicle.

Preferably, the charging method further includes a step of billing the user while replacing the first rechargeable battery with the second rechargeable battery.

DETAILED DESCRIPTION OF THE PREFERRED EMBODIMENTS

Figure 7:
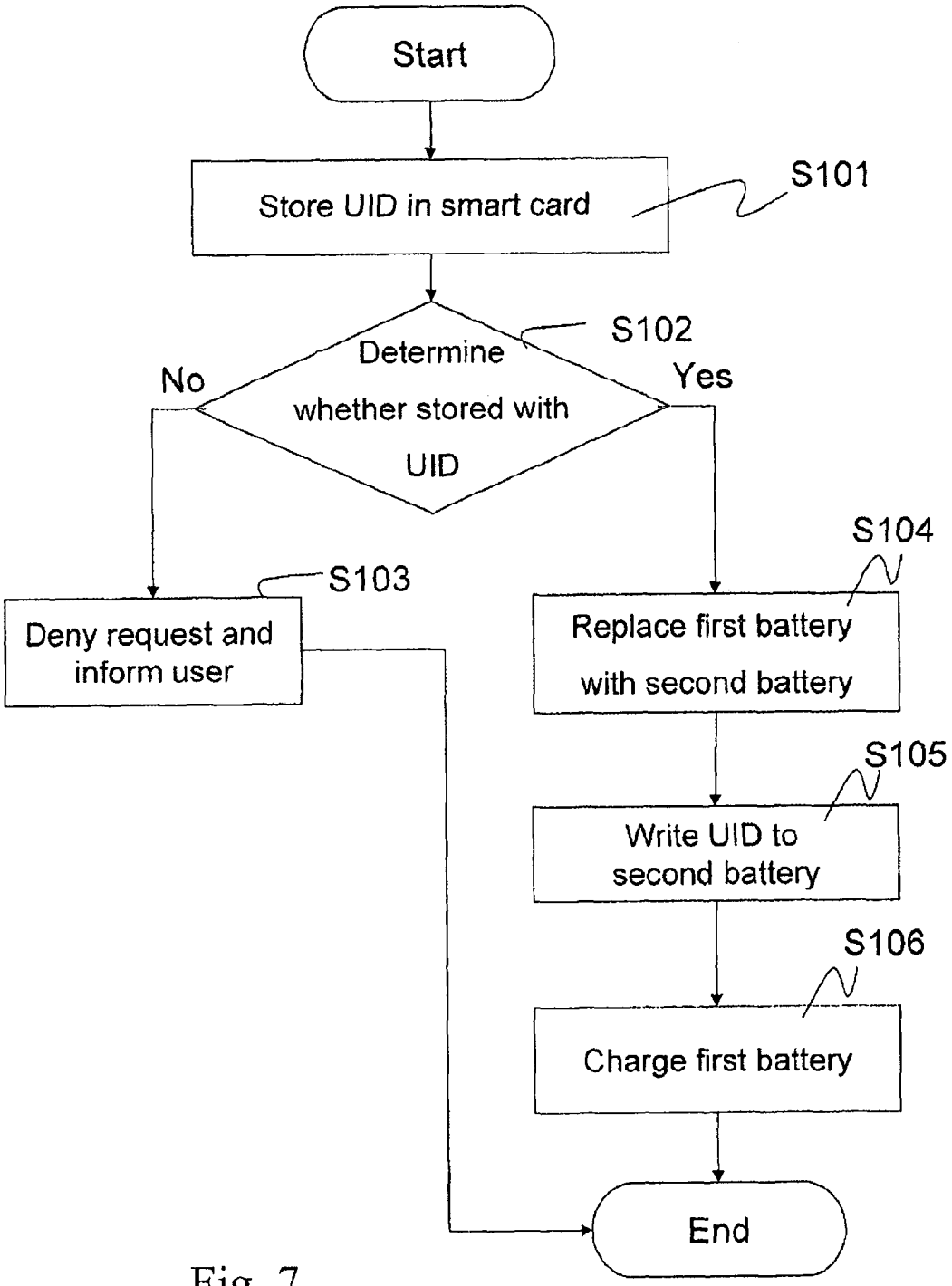
FIG. 7 is a flowchart of a charging method according to the present invention.

The present invention will now be described more specifically with reference to the following embodiment. Please refer to FIG. 3 to FIG. 7. FIG. 3 to FIG. 6 illustrate a charging system 100 of an electric vehicle 200 and detailed structure of the charging system 100. FIG. 7 is a flowchart showing how the charging system 100 operates.

Figure 1:
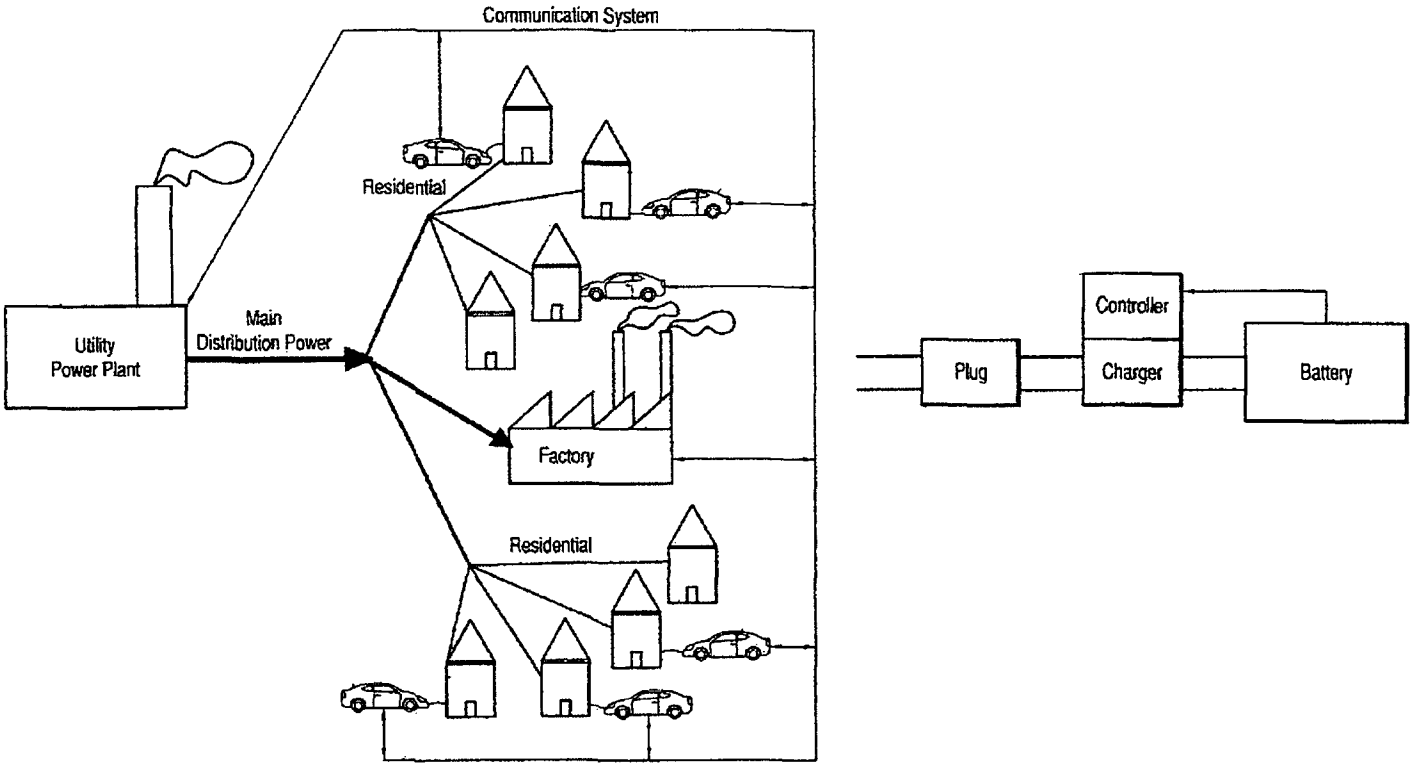
Fig. 1 (Prior Art)
FIG. 1 shows a prior art of a charging system.
Figure 2:
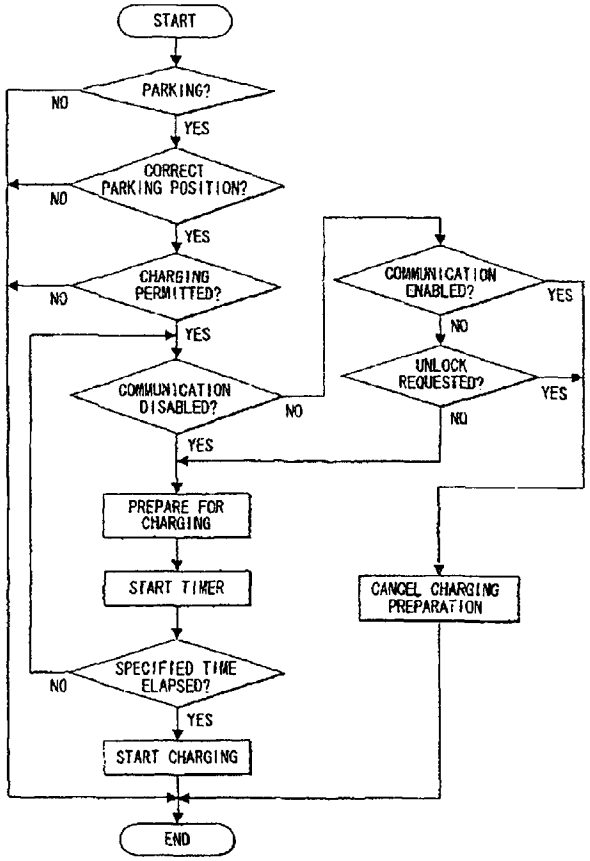
Fig. 2 (Prior Art)
FIG. 2 shows another prior art of a charging system.
Figure 3:
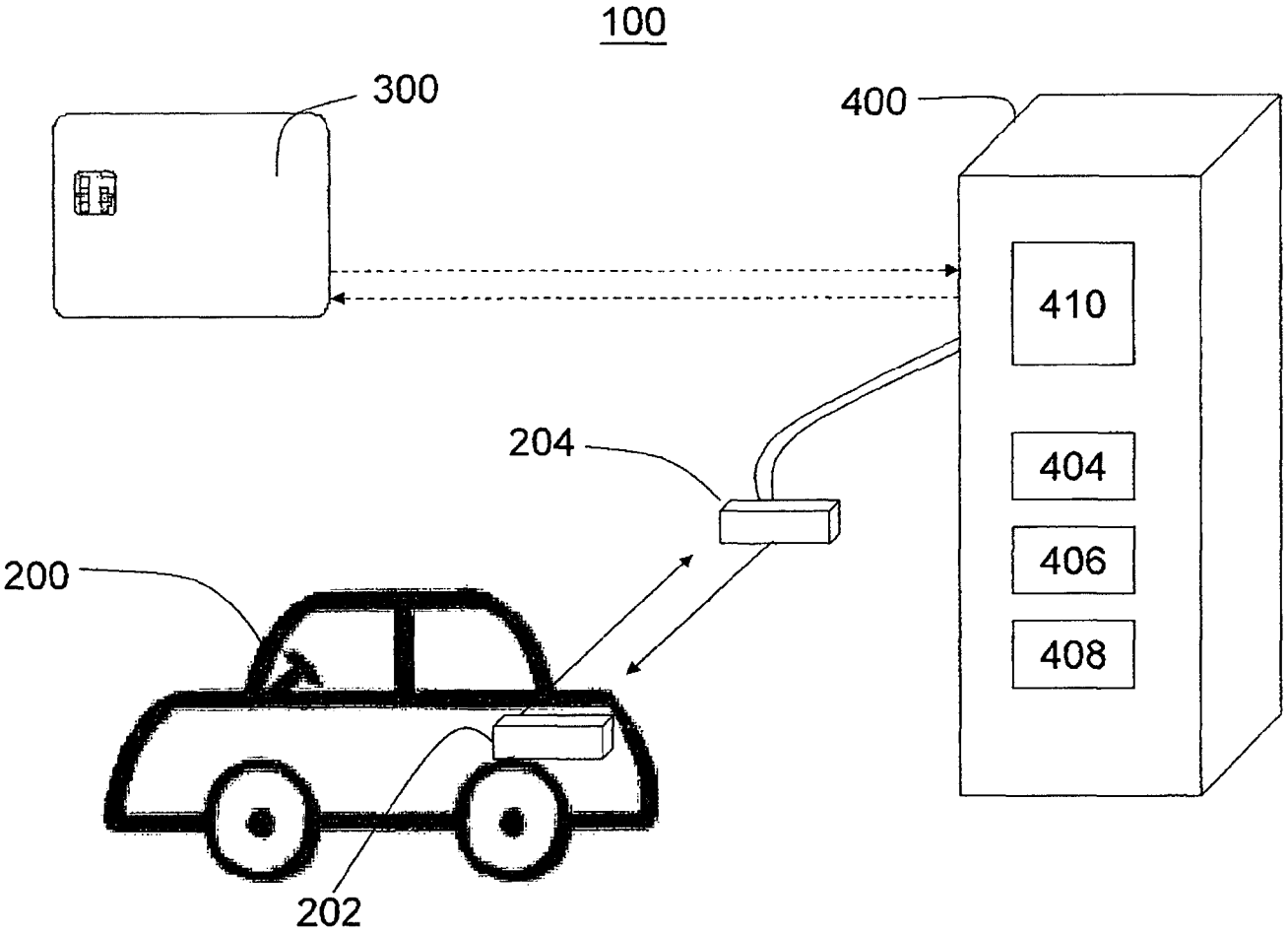
FIG. 3 illustrates an embodiment of the present invention.

Please see FIG. 3 first. The charging system 100 is composed of a first rechargeable battery 202, a second rechargeable battery 204, a smart card 300 and a charging station 400. The smart card 300 has a user identification (UID) for identifying a user of the electric vehicle 200. The smart card 300 can only be used for the electric vehicle 200, and therefore, if the user buys a new electric vehicle, the smart card 300 can not be used for the new electric vehicle and a new smart card is needed.

The first rechargeable battery 202 contains first battery information and is stored with the UID while installed in the electric vehicle 200 for providing electric power to the electric vehicle 200. The second rechargeable battery 204 has second battery information. It is used for replacing the first rechargeable battery 202 when the first rechargeable battery 202 is in low battery (solid arrows in FIG. 3). According to the spirit of the invention, the first rechargeable battery 202 in low battery is exchanged with the fully charged second rechargeable battery 204. The first battery information and the second battery information each comprises charging state, lifetime, cycle count and health state of the first rechargeable battery 202 or the second rechargeable battery 204.

According to the spirit of the present invention, any kind of smart card can be applied. In the embodiment, the smart card 300 conforms to ISO7810 and has near field communication (NFC) function for data transmission. Only when a smart card having a UID that matches with the electric vehicle 200, can the battery be exchanged. Hence, if a person doesn't own the smart card 300 or the electric vehicle 200 and takes the electric vehicle 200 or the first rechargeable battery 202 to charge, the charging station 400 will deny battery exchange and inform the original owner of this issue.

Figure 4:
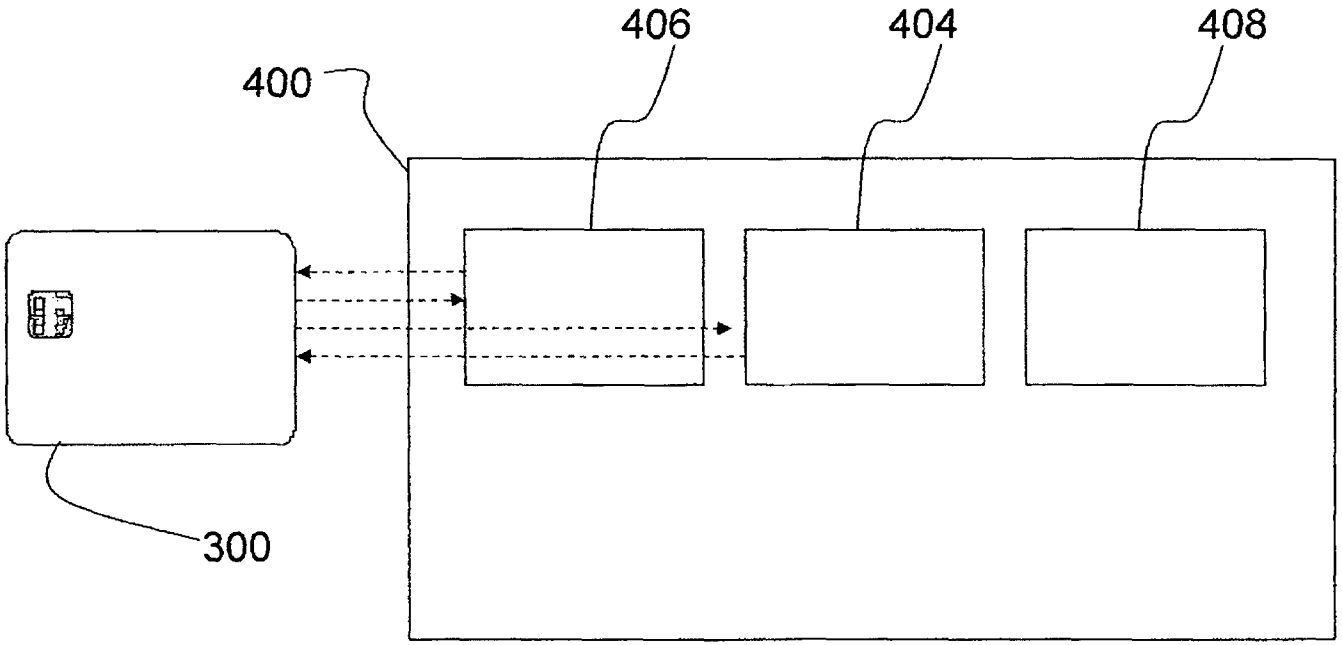
FIG. 4 describes detailed structure of a charging station in the embodiment.

In order to describe the charging station 400 in detail, please further refer to FIG. 4. The charging station 400 comprises a controlling module 404, an updating unit 406 and a charging set 408.

The controlling module 404 confirms that the first rechargeable battery 202 is stored with the UID and then allows replacement of the first rechargeable battery 202 with the second rechargeable battery 204. When the smart card 300 gets close to 5-10 cm from the controlling module 404, the confirming process proceeds (dashed arrows in FIG. 3).

The updating unit 406 writes the UID to the second rechargeable battery 204 while the first rechargeable battery 202 is replaced with the second rechargeable battery 204. Like the controlling module 404, the updating unit 406 is located in the charging station 400 where the smart card 300 can get close up to 5-10 cm for completing writing process.

The charging set 408 is used for charging the first and second rechargeable batteries 202 and 204. In this embodiment, the second rechargeable battery 204 is charged before battery exchange. Of course, after the first rechargeable battery 202 is uninstalled from the electric vehicle 200, the charging set 408 will then charge the first rechargeable battery 202. By battery exchange, the first and second rechargeable batteries 202 and 204 can be charged anytime. Therefore, the first and second rechargeable batteries 202 and 204 are usually charged during off-peak period of electricity supply when charge of electricity is lowest such that cost of charging can be reduced.

Outside of the charging station 400, there is a display unit 410. It displays the first battery information and the second battery information. If there is something wrong with charging processes, error information can be clearly displayed for check.

Figure 5:
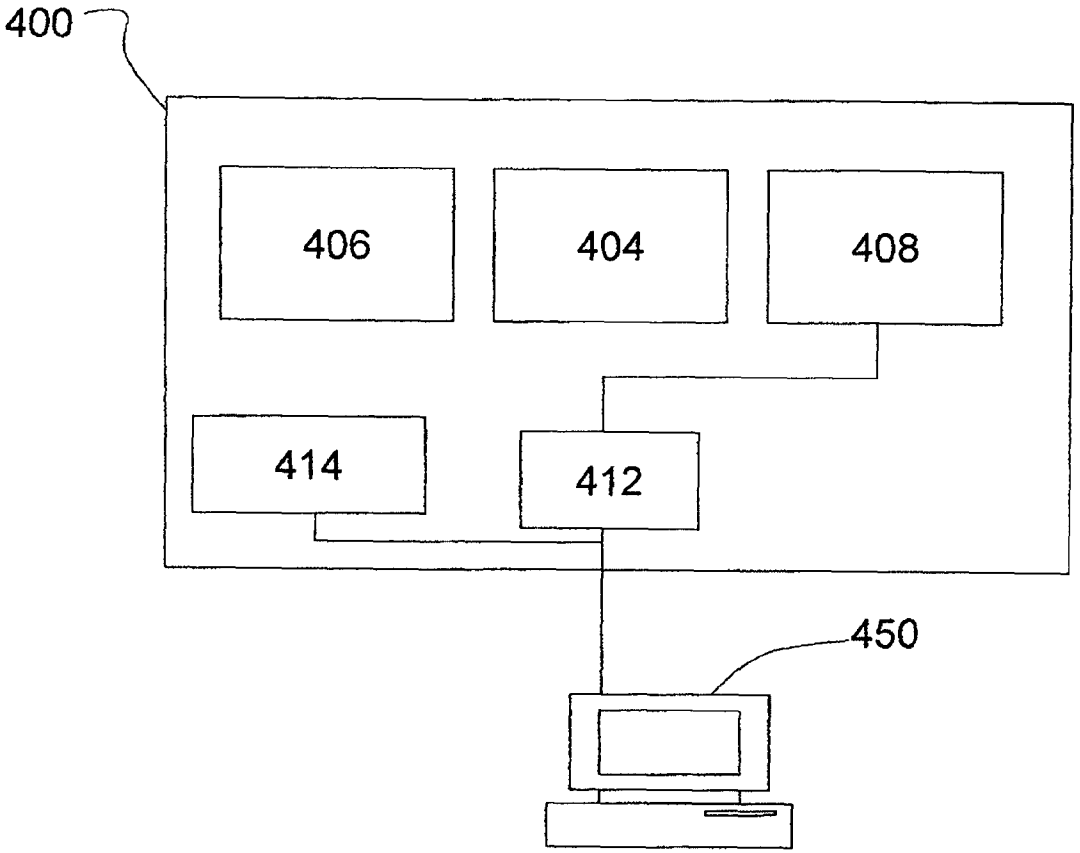
FIG. 5 describes another detailed structure of the charging station in the embodiment.
Figure 6:
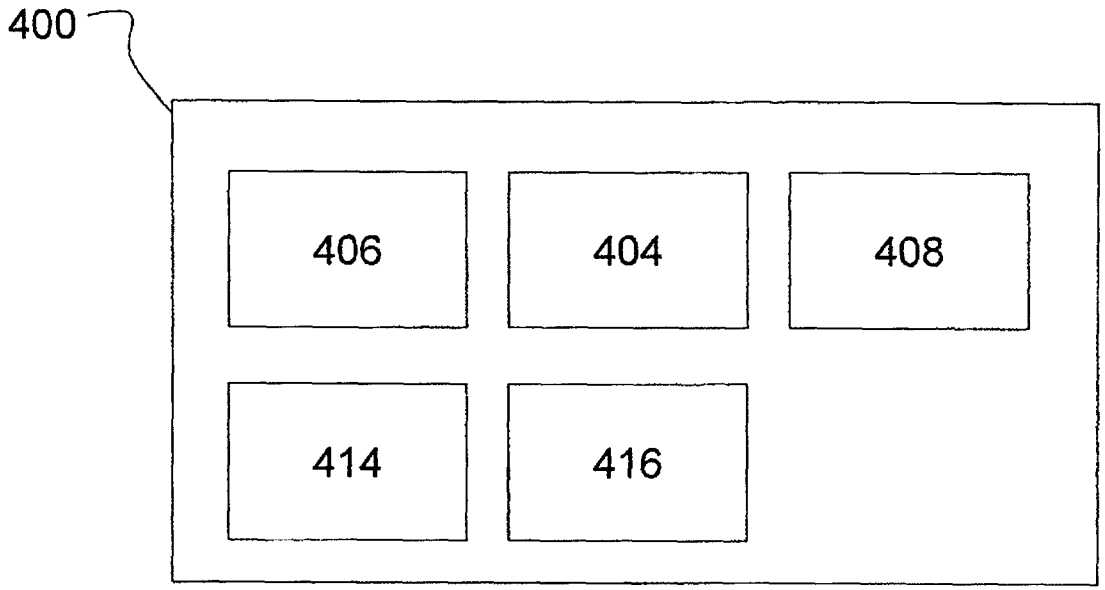
FIG. 6 describes still another detailed structure of the charging station in the embodiment.

Please refer to FIG. 5. According to the spirit of the present invention, the charging system 100 further comprises a transmitter 412. The transmitter 412 retrieves battery information from the rechargeable battery while the charging set 408 is connected to the rechargeable battery and transmits the charging state, lifetime, cycle count and health state of the first and second rechargeable batteries 202 and 204, and UID to a remote computer 450 via local area network (LAN), wide area network (WAN), wireless LAN or wireless WAN. Management job can be done outside of the charging station 400. The transmitting method can be wired or wireless communication. The remote computer 450 is also stored with the UID, user name, user telephone number, and license plate number of the electric vehicle 200.

Additionally, the charging system 100 further comprises a notifying unit 414. It can notify the user update of battery information via instant messaging service, short message service (SMS) or email. Instant messaging service includes skype, facebook, msn, and so on. The SMS is sent via telecommunications. The email is sent via local area network (LAN), wide area network (WAN), wireless LAN or wireless WAN. The notifying unit 414 is connected to the remote computer 450 and can be either inside or outside the charging station 400.

The charging system 100 can also have a billing unit 416 for billing the user while replacing the first rechargeable battery 202 with the second rechargeable battery 204. All costs can be summed up to the user. In the present invention, cost can be paid by a credit card or be deducted from the smart card which is used as a prepaid card.

Moreover, the first rechargeable battery 202 and the second rechargeable battery 204 each have a unique and unchangeable battery serial number. Therefore, even though UID of a rechargeable battery changes every time during battery exchange, the rechargeable battery can still be traced by its battery serial number. By this way, the rechargeable battery can be easily found if it is stolen. Furthermore, if the rechargeable battery is stolen, then the unchangeable battery serial number of the stolen rechargeable battery will be listed in a "black list" in the remote computer 450. By this way, the stolen rechargeable battery can be easily found since the stolen rechargeable battery has to be charged at the charging station 400 which has access to the "black list" of the remote computer 450.

Please see FIG. 7. The method for charging the electric vehicle 200 by the charging system 100 is described below. First, the smart card 300 is stored with the UID for identifying a user of the electric vehicle 200 (Step S101). Then, whether the first rechargeable battery is stored with the UID is determined (Step S102). If the first rechargeable battery 202 is not stored with the UID, then battery exchange request will be denied and the original owner will be informed of this issue (Step S103). If the first rechargeable battery 202 is confirmed stored with the UID, then battery exchange request will be accepted and the first rechargeable battery 202 in low battery will be replaced with the second rechargeable battery 204 (Step S104). Subsequently, the UID will be written to the second rechargeable battery 204 while the first rechargeable battery 202 is replaced with the second rechargeable battery 204 (Step S105). Finally, the first rechargeable battery 202 is charged (Step S106).

According to the spirit of the present invention, the method may further include the following steps:

1. The charging state, lifetime, cycle count and health state of the rechargeable batteries 202 and 204, and UID are transmitted to the remote computer 450 via local area network (LAN), wide area network (WAN), wireless LAN or wireless WAN. This step can be done after Step S106.

2. The first user information, the first battery information, and the second battery information are displayed. This step can be done among any step after Step S102.

3. The user is billed after replacement of the first rechargeable battery with the second rechargeable battery. This step can be done between Step S104 and Step S106.

4. The user is notified of update of battery information via instant messaging service, short message service (SMS) or email. This step can be done between Step S104 and Step S106.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A charging system of an electric vehicle, comprising:

a [smart card] *memory device* having a user identification (UID) for identifying a user of the electric vehicle;

a first rechargeable battery having first battery information and stored with the UID while installed in the electric vehicle, for providing electric power to the electric vehicle;

a second rechargeable battery having second battery information and stored with the UID while the first rechargeable battery in low battery is replaced with the second rechargeable battery; and a charging station, comprising:

a controlling module for confirming that the first rechargeable battery is stored with the UID and then allowing replacement of the first rechargeable battery with the second rechargeable battery;

an updating unit for writing the UID to the second rechargeable battery while the first rechargeable battery is replaced with the second rechargeable battery; and a charging set for charging the first and second rechargeable batteries.

2. The charging system according to claim 1, wherein the first and second rechargeable batteries each has a unique and unchangeable battery serial number.

3. The charging system according to claim 1, wherein the first and second battery information each comprises charging state, lifetime, cycle count and health state of the rechargeable battery.

4. The charging system according to claim 1, further comprising a transmitter for transmitting the charging state, lifetime, cycle count and health state of the rechargeable battery, and UID to a remote computer local area network (LAN), wide area network (WAN), wireless LAN or wireless WAN.

5. The charging system according to claim 4, wherein the remote computer is stored with the UID, user name, user telephone number, and license plate number of the electric vehicle.

6. The charging system according to claim 1, further comprising a billing unit for billing the user while replacing the first rechargeable battery with the second rechargeable battery.

7. The charging system according to claim 1, further comprising a notifying unit for notifying the user update of battery information via instant messaging service, short message service (SMS) or email.

8. In an electric vehicle having a first rechargeable battery, a method for charging the electric vehicle, comprising the steps of:

storing in a smart [card] *device* a user identification (UID) for identifying a user of the electric vehicle;

determining whether the first rechargeable battery is stored with the UID;

replacing the first rechargeable battery in low battery with a second rechargeable battery; and writing the UID to the second rechargeable battery while the first rechargeable battery is replaced with the second rechargeable battery.

9. The charging method according to claim 8, wherein the first and second rechargeable batteries each has a unique and unchangeable battery serial number.

10. The charging method according to claim 8, wherein the first and second rechargeable battery each has battery information which comprises charging state, lifetime, cycle count and health state of the rechargeable battery.

11. The charging method according to claim 10, further comprising a step of notifying the user update of the battery information via instant messaging service, short message service (SMS) or email.

12. The charging method according to claim 8, further comprising a step of transmitting the charging state, lifetime, cycle count and health state of the rechargeable battery, and UID to a remote computer via local area network (LAN), wide area network (WAN), wireless LAN or wireless WAN.

13. The charging method according to claim 12, wherein the remote computer is stored with the UID, user name, user telephone number, and license plate number of the electric vehicle.

14. The charging method according to claim 8, further comprising a step of billing the user while replacing the first rechargeable battery with the second rechargeable battery.

*15. The charging system according to claim 1, wherein the smart card is further used for matching with one of the electric vehicle and the first rechargeable battery.*

*16. The charging system according to claim 15, wherein when the user is performing the replacement of the first rechargeable battery with the second rechargeable battery, if there is one of cases that the user is not an owner of the smart card and the user is not an owner of the electric vehicle, the charging station performs at least one of denying the replacement and informing the case to at least one owner of the smart card and the electric vehicle.*

*17. The charging system according to claim 8, wherein the smart device is a smart card.*

*18. A method for charging an electric vehicle having a first rechargeable battery, comprising the steps of:*

*determining whether the first rechargeable battery is stored with a user identification (UID) for identifying a user of one of the first rechargeable battery and the electric vehicle;*

*replacing the first rechargeable battery with a second rechargeable battery; and*

*storing the UID in the second rechargeable battery while the first rechargeable battery is replaced with the second rechargeable battery.*

*19. The charging method according to claim 18, further comprising a step of: providing a smart device for matching with one of the electric vehicle and the first rechargeable battery.*

*20. The charging method according to claim 19, further comprising a step of: when the replacing step is performed, if there is one of cases that the user is not an owner of the smart device and the user is not an owner of the electric vehicle, performing at least one of disabling the replacing step and informing the case to at least one owner of the smart device and the electric vehicle.*

*21. The charging method according to claim 20, wherein the smart device is stored with the UID for matching with one of the electric vehicle and the first rechargeable battery.*

*22. The charging method according to claim 21, wherein:*

*the smart device is a smart card;*

*the first and second rechargeable batteries each has a unique and unchangeable battery serial number; and*

*the first and second rechargeable battery each has battery information which includes charging state, lifetime, cycle count and health state of the respective rechargeable battery.*

*23. The charging method according to claim 22, further comprising steps of:*

*notifying the user update of the battery information via one selected from a group consisting of instant messaging service, short message service (SMS) and email;*

*transmitting the battery information and UID to a remote computer via one selected from a group consisting of local area network (LAN), wide area network (WAN), wireless LAN and wireless WAN; and*

*billing the user while replacing the first rechargeable battery with the second rechargeable battery.*

* * * * *